US012617152B2

(12) United States Patent
Patil et al.

(10) Patent No.: US 12,617,152 B2
(45) Date of Patent: May 5, 2026

(54) THREE-DIMENSIONAL PRINTER APPARATUS HAVING ELECTRO-OSMOTIC LUBRICANT FLOW

(71) Applicant: Nissan North America, Inc., Franklin, TN (US)

(72) Inventors: Sandeep Patil, Farmington Hills, MI (US); Nanzhu Zhao, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 261 days.

(21) Appl. No.: 18/214,356

(22) Filed: Jun. 26, 2023

(65) Prior Publication Data

US 2024/0424734 A1      Dec. 26, 2024

(51) Int. Cl.
| | |
|---|---|
| *B29C 64/245* | (2017.01) |
| *B29C 64/124* | (2017.01) |
| *B29C 64/336* | (2017.01) |
| *B33Y 30/00* | (2015.01) |
| *B33Y 40/00* | (2020.01) |

(52) U.S. Cl.
CPC .......... *B29C 64/245* (2017.08); *B29C 64/124* (2017.08); *B29C 64/336* (2017.08); *B33Y 30/00* (2014.12); *B33Y 40/00* (2014.12)

(58) Field of Classification Search
CPC ... B29C 64/245; B29C 64/124; B29C 64/336; B29C 64/255; B33Y 30/00; B33Y 40/00; B33Y 10/00
See application file for complete search history.

(56) References Cited

U.S. PATENT DOCUMENTS

| | | | |
|---|---|---|---|
| 2022/0001612 A1 | 1/2022 | Zhao et al. | |
| 2022/0063194 A1* | 3/2022 | Abdul Jabbar | ........ B33Y 50/02 |
| 2022/0227664 A1* | 7/2022 | Lambricht | .............. C03C 17/32 |
| 2023/0067468 A1* | 3/2023 | Sun | ........................ B33Y 10/00 |
| 2023/0158736 A1 | 5/2023 | Zhao et al. | |
| 2023/0158741 A1 | 5/2023 | Zhao et al. | |
| 2023/0158744 A1 | 5/2023 | Zhao et al. | |
| 2024/0300174 A1* | 9/2024 | Dorfinger | ............. B29C 64/223 |

* cited by examiner

*Primary Examiner* — Michael M. Robinson
(74) *Attorney, Agent, or Firm* — Spencer Fane, LLP

(57) ABSTRACT

A three-dimensional printing system is provided that includes a tank, a textured substrate connected to the tank, and at least one electrode. The tank contains a liquid photopolymer resin and a lubricant. The textured substrate is configured to allow light to pass through into the liquid photopolymer resin. The at least one electrode is configured to control a flow of the lubricant on the textured substrate.

16 Claims, 10 Drawing Sheets

THREE-DIMENSIONAL PRINTER APPARATUS HAVING ELECTRO-OSMOTIC LUBRICANT FLOW

BACKGROUND

Field of the Invention

The present invention generally relates to a three-dimensional printing system having electro-osmotic lubricant flow, and a textured window for such a system. The three-dimensional printing system includes a tank containing a liquid photopolymer resin and a lubricant, a textured substrate connected to the tank, and at least one electrode. The textured substrate is configured to allow light to pass through into the liquid photopolymer resin. The at least one electrode is configured to control a flow of the lubricant on the textured substrate. The textured window includes a textured substrate configured to allow light to pass through into a liquid photopolymer resin and at least one electrode. The textured substrate includes pillars projecting from a surface of the textured substrate. Each of the at least one electrode comprises an electrode material formed in one of the pillars.

Background Information

Three-dimensional ("3D") printers have been used to print a wide variety of three-dimensional products. Objects are printed layer by layer by the 3D printer by curing portions of a light curable photopolymer resin layer by layer, one layer at a time, within a printing area of a tank filled with the photopolymer resin. A curing device, such as an ultraviolet light source, is projected through a transparent substrate or bottom wall of the tank curing each layer of the object on a carrier surface that is at least partially submerged within the photopolymer. The carrier surface is incrementally raised upward as each layer is cured thereon. One problem with such conventional arrangement is that portions of the photopolymer resin can adhere to the transparent substrate (bottom wall of the tank). This adhesion slows and/or delays the printing process, thereby decreasing productivity. It is therefore advantageous to prevent adhesion of the photopolymer to the transparent substrate.

In order to address this problem of adhesion, textured windows have been developed that include a textured surface in contact with the photopolymer resin. The textured surface includes grooves that are configured to hold lubricant. The textured windows are substantially transparent and can be used as the transparent substrate. By providing a layer of the lubricant between the photopolymer resin and the transparent substrate, adhesion between the photopolymer and transparent substrate can be reduced.

Although these lubricant-infused textured windows can improve the printing speed by increasing the slip length along the textured window in the print area, when the lubricant is filled in the grooves of the textured substrate, bubbles may be generated. The bubbles undesirably reduce the transparency of the textured window and thereby increase both the energy consumption of the printer apparatus and the loss of light emitted to cure the photopolymer resin. Furthermore, the amount of lubricant along the surface of the textured window is depleted over time. Therefore, adhesion between the photopolymer and the transparent substrate can still become a problem when the amount of lubricant lost reaches a certain level. For example, a 20% loss in lubricant can render the textured window useless for printing due to adhesion problems. In addition, adhesion of the photopolymer to the transparent substrate can damage the textured window.

Therefore, further improvement is needed to increase the transparency of the textured substrate and reduce the adhesion of the photopolymer to the transparent substrate during operation. In particular, it is desirable to improve the flow of lubricant on the surface of the textured window and to thereby improve the energy efficiency of the 3D printer and extend the time which the 3D printer can continuously print.

SUMMARY

It has been discovered that the amount of bubbles in the lubricant filled in the grooves of the textured substrate can be reduced by providing a system in which transparent electrodes are disposed on the textured window to cause an electro-osmotic flow of the lubricant across and within the grooves of the textured substrate. The system includes a textured window including at least one transparent electrode configured to control a flow of the lubricant on the textured substrate. In particular, by providing the transparent electrode(s) on the textured substrate, the electrode(s) cause an electro-osmotic flow of the lubricant across and within the grooves of the textured substrate, thereby preventing undesirable bubbles that reduce the transparency of the textured window. Furthermore, by providing the electrode(s) on the transparent substrate, the flow of lubricant into specific areas or grooves of the textured window can be more precisely controlled such that electro-osmotic flow of the lubricant can be caused only in areas of the textured substrate where the amount of lubricant is low.

Therefore, it is desirable to provide a three-dimensional printing system that includes such a system with at least one electrode that is configured to cause an electro-osmotic flow of lubricant on the textured substrate. It is also desirable to provide a three-dimensional printing system that includes a controller configured to move lubricant into a first portion of a textured window at a faster rate than other portions of the textured window.

In view of the state of the known technology, one aspect of the present disclosure is to provide a three-dimensional printing system. The three-dimensional printing system includes a tank containing a liquid photopolymer resin and a lubricant, a textured substrate connected to the tank, and at least one electrode. The at least one electrode is configured to control a flow of the lubricant on the textured substrate. By providing the at least one electrode configured to control a flow of lubricant on the textured substrate, the at least one electrode causes an electro-osmotic flow of the lubricant across and within the grooves of the textured substrate, thereby preventing undesirable bubbles that reduce the transparency of the textured window.

Another aspect of the present disclosure is to provide a three-dimensional printing system comprising a textured window and a controller. The textured window includes a first substrate that is optically transparent and at least one electrode. The first substrate includes a textured surface. The controller is configured to move lubricant into a first portion of the textured window at a faster rate than other portions of the textured window. By providing the at least one electrode and a controller configured to move lubricant into one part of the textured substrate at a faster rather than other parts, the flow of lubricant into specific areas of the textured window can be more precisely controlled such that electro-osmotic flow of the lubricant can be caused only in desired areas of the textured substrate, for example areas where the amount of lubricant is low.

A further aspect of the present disclosure is to provide a textured window for a three-dimensional printing system. The textured window includes a textured substrate and at least one electrode. The textured substrate is configured to allow light to pass through into a liquid photopolymer resin and includes a plurality of pillars projecting from a surface of the textured substrate. Each of the at least one electrode comprises an electrode material formed in one of the plurality of pillars. By forming the electrode(s) in one of the pillars of the textured substrate, finer control of the individual electrodes and, thus, the flow of lubricant, can be achieved.

BRIEF DESCRIPTION OF THE DRAWINGS

Referring now to the attached drawings which form a part of this original disclosure:

FIG. 2b is a partial enlarged cross sectional view of the printer assembly having the textured window of FIG. 2a;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
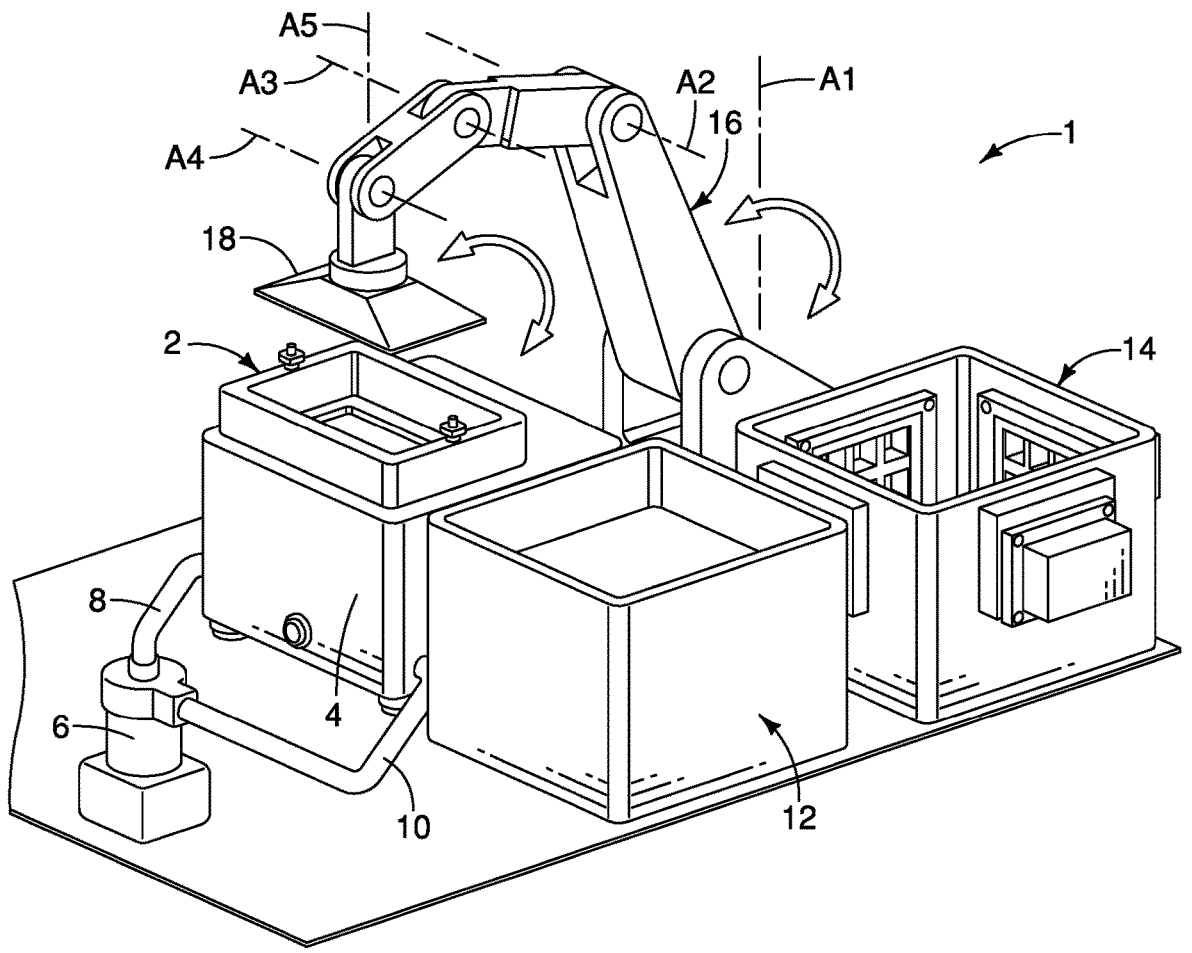
FIG. 1 is a perspective view of a 3D printer apparatus including a printer assembly having a textured window according to a first embodiment.

Referring initially to FIG. 1, a three-dimensional printer apparatus 1 (hereinafter the 3D printer apparatus 1) is illustrated in accordance with a first embodiment. The 3D printer apparatus 1 includes a printer assembly 2 having a tank 4. The printer apparatus 1 also includes a lubricant source 6, a first pipe 8, a second pipe 10, a rinse station 12, a final curing station 14, a robotic arm 16 and an object carrier 18 connected to the robotic arm 16.

As shown in FIG. 1, the printer assembly 2, the lubricant source 6, the first pipe 8, the second pipe 10, the rinse station 12, the final curing station 14, the robotic arm 16 and the object carrier 18 are shown as an assembled group of devices. Alternatively, the 3D printer apparatus I can be separate stations that are individual units where the robotic arm 16, or a series of robotic arms are operated together in order to access and utilize the features of each of separated versions of the printer assembly 2, the rinse station 12 and the final curing station 14. It should be understood that the 3D printer apparatus 1 can include any suitable devices in addition to the printer assembly 2. For example, the 3D printer apparatus 1 can include only the printer assembly 2 and the robotic arm 16.

The lubricant source 6 is any suitable source for supplying and/or circulating lubricant in the tank 4. For example, the lubricant source 6 can be a micropump or a reservoir.

The printer assembly 2, the lubricant source 6, the first pipe 8, the second pipe 10, the rinse station 12, the final curing station 14, the robotic arm 16 and the object carrier 18 can each be formed of any suitable material, such as a plastic material, a polymer materials and/or a metallic material.

As shown schematically in FIG. 2, the printer assembly 2 includes a tank 4 that has a textured window 26 and the object carrier 18 connected to the robotic arm 16. The object carrier 18 is configured to carry an object 20 that is printed by the printer assembly 2. The printer assembly 2 also includes a resin curing device 28 that emits ultraviolet light 30. A more detailed description of each of these portions of the printer assembly 2 is provided after a brief overview of the basic functions of these features.

As is also shown in FIG. 2, during operation of the printer assembly 2, the tank 4 is at least partially filled with two differing liquid layers—top liquid layer 22 and bottom liquid layer 24. The top liquid layer 22 is a polymerizable resin that covers the bottom liquid layer 24. The top liquid layer 22 can be any suitable polymerizable resin, for example a photopolymer resin that is polymerized by the ultraviolet light 30. The top liquid layer 22 is preferably a photopolymer resin. In particular, the top liquid layer 22 can be formed of: a nylon having a photoinitiator wavelength of 290-315 nm, an acrylic having a photoinitiator wavelength of 290-315 nm, a styrene acrylonitrile having a photoinitiator wavelength of 290-330 nm, a polycarbonate having a photoinitiator wavelength of 280-310 nm, a polystyrene having a photoinitiator wavelength of 310-325 nm, a polyethylene having a photoinitiator wavelength of 300-340 nm, a polypropylene having a photoinitiator wavelength of 290-370 nm, an acrylonitrile butadiene styrene ("ABS") photopolymer having a photoinitiator wavelength of 300-385 nm, a polyvinyl chloride ("PVC") homopolymer having a photoinitiator wavelength of approximately 320 nm, a PVC copolymer having a photoinitiator wavelength of 330-370 nm, a polyurethane (aromatic) having a photoinitiator wavelength of 350-415 nm, or a mixture thereof.

The top layer 22 flows freely into the printing area P during the operation of the printing assembly 2, as is described in greater detail below. The polymerizable resin that forms the top layer 22 can be supplied to the tank 4 such that the polymerizable resin fills most or all of the interior volume of the tank 4, depending upon the object 20 being printed and the anticipated volume of use of polymerizable resin needed to print the object 20 being printed by the printer assembly 2.

The bottom liquid layer 24 is a lubricant that covers the textured window 26 and forms a liquid layer between the textured window 26 and the top liquid layer 22. One of the purposes of the bottom liquid layer 24 is to separate and space apart the polymerizable resin in the top liquid layer 22 from the textured window 26 of the tank 4. The bottom liquid layer 24 can be formed of any suitable lubricant, such as an oil having a low viscosity and low adhesion. For example, the bottom liquid layer 24 can be formed of a fluorinated oil. The fluorinated oil is preferably a perfluoropolyether ("PFPE") copolymer, a fluorosilicone polymer, a perfluorocarbon liquid, allicin oil, garlic oil, a synthetic PFPE-based oil that contains polytetrafluoroethylene ("PTFE") powder such as Krytox® GPL oil, Fomblin® Y PFPE oil, or a mixture thereof. The bottom layer 24 has a thickness of approximately 3 nm to 5 mm from the top surface of the textured window 26 facing the top liquid layer 22 to the bottom surface of the top liquid layer 22 facing the textured window 26.

The bottom liquid layer 24 can also contain an additive to aid in promoting the electro-osmotic flow of lubricant in the textured window 26. For example, the additive can be methylcellulose or any other suitable additive.

Figure 2A:
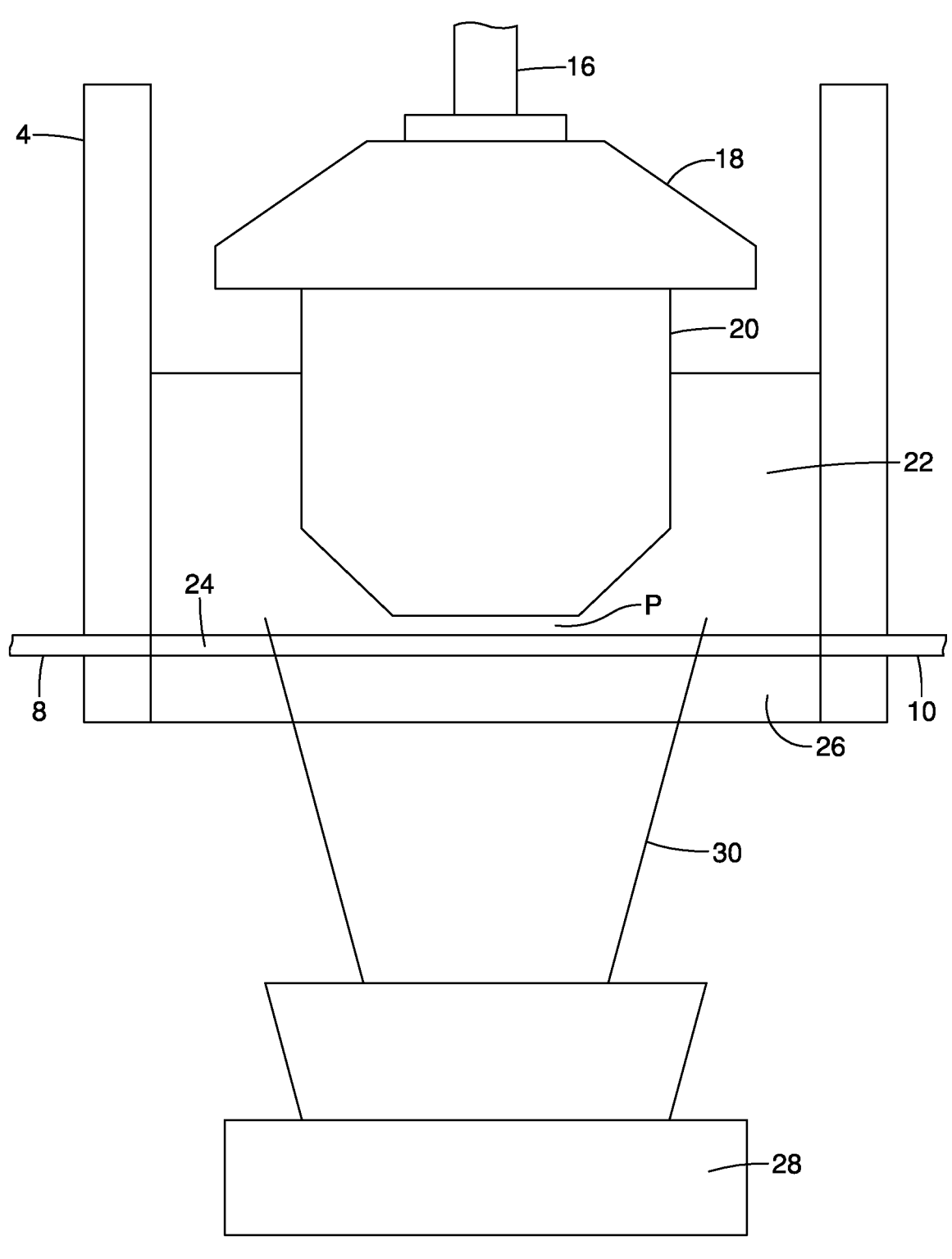
FIG. 2a is a side view of the printer assembly having the textured window according to the first embodiment.

The textured window 26 is a structure formed at the bottom of the tank 4 as shown in FIG. 2a. The textured window 26 can be connected to the bottom of the tank 4 in any suitable manner or can be formed integrally with the bottom of the tank 4. For example, the textured window 26 can be attached to bottom ends or bottom edge sections of each side wall of the tank 4 to form a liquid tight space within the tank 4. The tank 4 can be manufactured of any suitable material, such as a plastic material, a polymer material and a metallic material, or any mixture thereof. The textured window 26 is also connected to the first pipe 8 and the second pipe 10 of the printer assembly 2 such that the liquid from lubricant source 6 can be circulated to and from the textured window 26 in the tank 4. For example, if the lubricant source 6 is a micropump, liquid from the bottom liquid layer 24 is circulated to and from the tank via the first pipe 8 and the second pipe 10, respectively. Alternatively, if the lubricant source 6 is a reservoir, lubricant contained in the lubricant source 6 can be supplied to and from the reservoir via the second pipe 10 and the first pipe 8, respectively.

The textured window 26 has a total thickness of approximately 10 μm to 5 cm. The textured window 26 is optically transparent and has an ultraviolet light transmittance of at least 60%, preferably at least 90%, such that focused beams of light from the resin curing device 28 pass therethrough and at predetermined areas or portions of the polymerizable resin located within the printing area P.

The resin curing device 28 is installed or located below the tank 4 and is positioned to selectively project light upward through transparent textured window 26 of the tank 4. An electronic controller (not shown) controls operation of the resin curing device 28 to cure and harden the polymerizable resin in the top liquid layer 22 located within the printing area P in order to form the object 20. The resin curing device 28 can be any of a variety of resin curing light sources such as an ultra-violet projector, laser (stereolithography) digital light projector, liquid crystal display, projector or other light emitting device capable of electronic focusing and imaging focused light in order to selectively cure polymerizable resin to form the object 20.

The printing area P is defined as being the space below the object carrier 16 (at and/or below a lower surface of the object 20 being printed) and the upper surface of the bottom liquid layer 24. Further, the printing area P is preferably located above and spaced apart from the textured window 26 of the tank 4 but can be in contact with the textured window 26 if the bottom liquid layer 24 is depleted during operation.

Figure 2B:
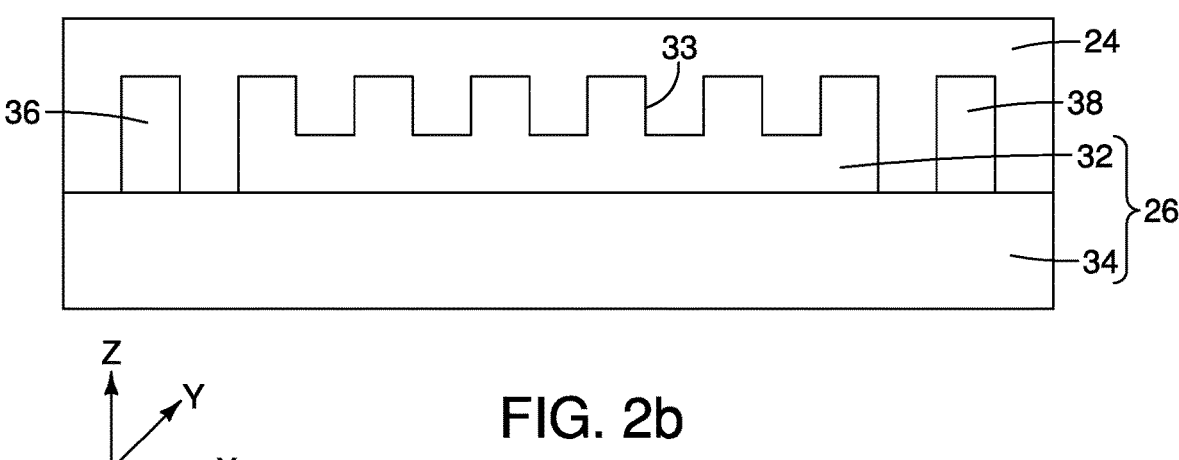

As shown in FIG. 2b, the textured window 26 includes a first substrate 32 and a plurality of pillars 33 projecting from the surface of the first substrate 32 facing the bottom liquid layer 24. The first substrate 32 is formed of any suitable optically transparent and soft polymer material. For example, the first substrate 32 can be made of an optically transparent silicone polymer such as polydimethylsiloxane ("PDMS"), an optically transparent fluorinated polymer, or a mixture thereof. Preferably, the first substrate 32 is made of PDMS. The first substrate 32 can also be porous. The first substrate 32 preferably has a porosity of approximately 30% to 70%. The first substrate 32 has a thickness of approximately 5 nm to 200 μm.

Figure 3:
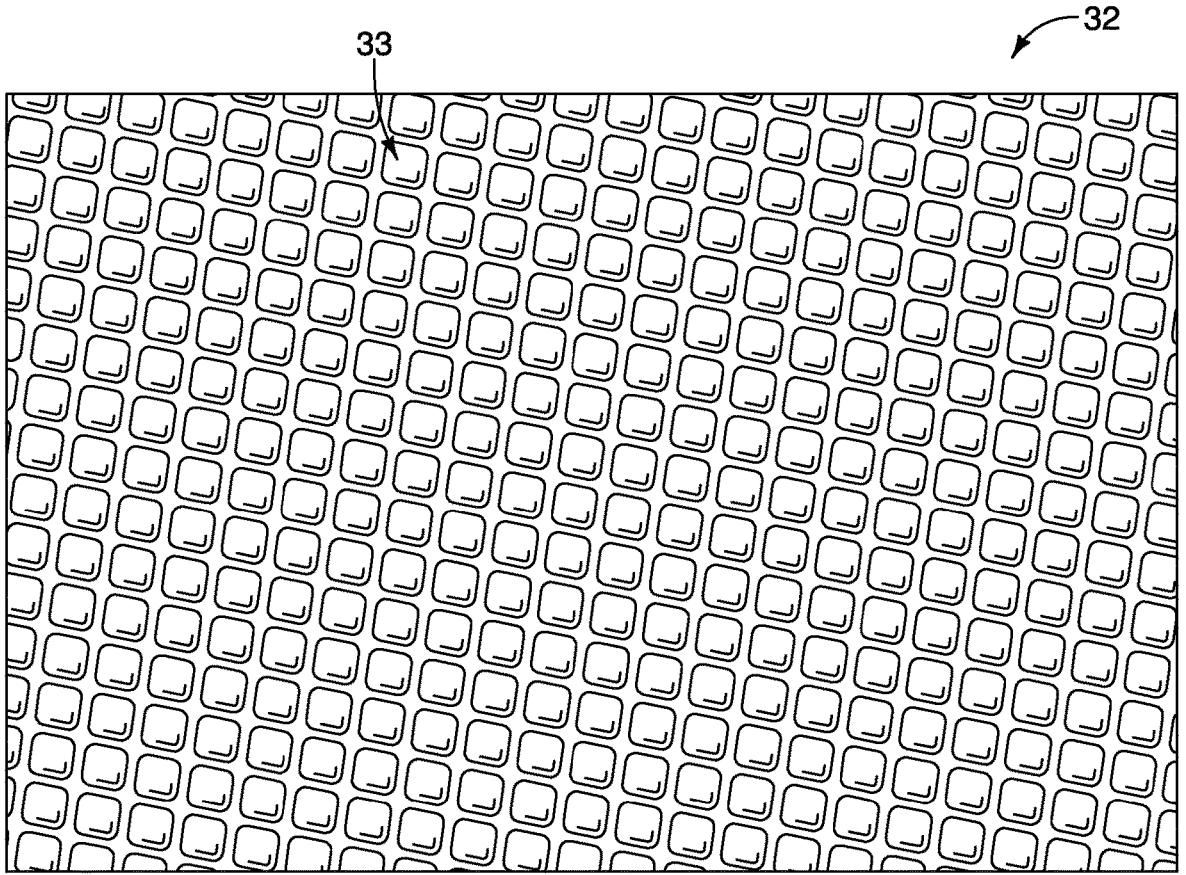
FIG. 3 is a partial enlarged top perspective view of the textured window according to the first embodiment.

The pillars 33 form a textured surface on the top of the first substrate 32 facing the bottom liquid layer 24. The pillars 33 are configured to hold liquid from the bottom liquid layer 24 between the pillars 33 and can have any suitable shape. For example, the pillars 33 have a pillar-like shape and are formed as projections from the top surface of the first substrate 32. Preferably, the pillars 33 have a cubic shape as illustrated in FIG. 3 with a same length, width and height from the surface of the first substrate 32. The pillars 33 have a height, length and width each ranging from approximately 0.1 μm to 100 μm.

As shown in FIG. 2b, the first substrate 32 is formed on a top surface of a second substrate 34. The first substrate 32 can be formed on the top surface of the second substrate 34 in any suitable manner. For example, the first substrate 32 can be adhered to the second substrate 34 by an adhesive material. Alternatively, the first substrate 32 can be deposited on the second substrate 34 by any suitable deposition method, such as chemical vapor deposition ("CVD"), etching or additive and subtractive methods.

The second substrate 34 is formed of any suitable optically transparent material. For example, the second substrate 34 can be made of any suitable transparent material, such as plexiglass, traditional glass, any suitable transparent plastic or polymer material, or a mixture thereof. Preferably, the second substrate 34 is made of a glass material. The second substrate 34 has a thickness of approximately 9 μm to 3 cm.

Figure 2C:
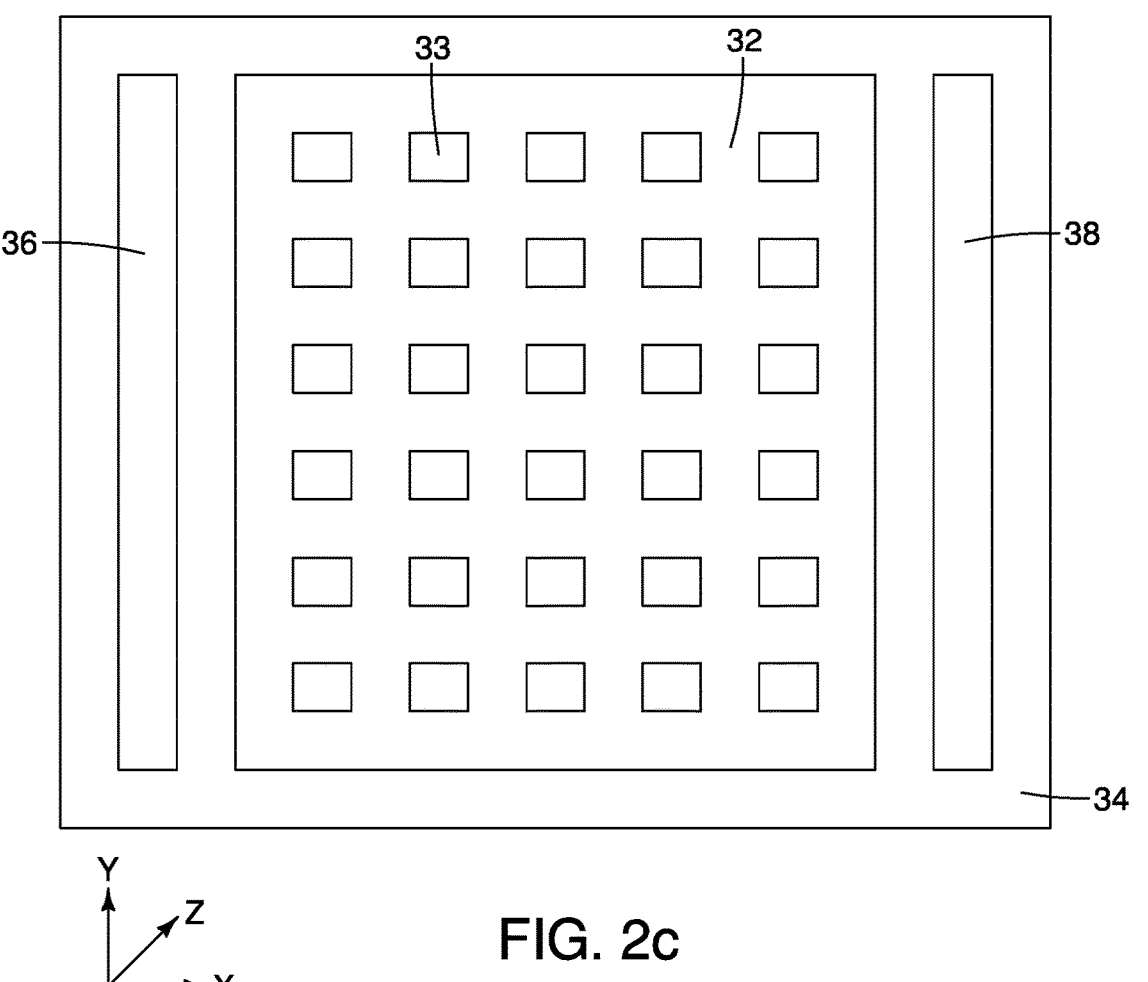
FIG. 2c is a top view of the textured window according to the first embodiment.

The textured window 26 also includes a first electrode 36 and a second electrode 38 provided on opposite sides of the first substrate 32. As shown in FIGS. 2b and 2c, the first electrode 36 and the second electrode 38 are both provided on the top surface of the second substrate 34. The first electrode 36 is optically transparent and has an ultraviolet light transmittance of at least 60%, preferably at least 90%. The first electrode 36 is a positive electrode. The first electrode 36 can be formed of any suitable conductive and transparent positive electrode material, such as indium tin oxide, aluminum doped zinc oxide ("AZO"), AgNW, AgNW-ZnO, gallium oxide nanoparticles with a quartz substructure, a layered structure of AZO/Ag/AZO, or a layered structure of $MoO_3$/graphene/$MoO_3$. The first electrode 36 has a thickness of approximately 0.1 μm to 10 mm.

Like the first electrode 36, the second electrode 38 is also optically transparent and has an ultraviolet light transmittance of at least 60%, preferably at least 90%. The second electrode 38 is a negative electrode. The second electrode 38 can be formed of any suitable conductive and transparent negative electrode material, such as indium tin oxide, AZO, AgNW, AgNW-ZnO, gallium oxide nanoparticles with a quartz substructure, a layered structure of AZO/Ag/AZO, or a layered structure of $MoO_3$/graphene/$MoO_3$. For example, the transparent negative electrode material can be the same as the transparent positive electrode material. The second electrode 38 has a thickness of approximately 0.1 μm to 10 mm.

In this embodiment, the first electrode 36 is a positive electrode formed of a positive electrode material and the negative electrode 38 is a negative electrode formed of a negative electrode material. However, it should be understood that alternatively, the first electrode 36 can be a negative electrode formed of a negative electrode material and the second electrode 38 can be a positive electrode formed of a positive electrode material.

FIG. 2c shows a top view of the textured window 26 of FIG. 2b. As shown in FIG. 2c, the plurality of pillars 33 are formed in a grid-like pattern in the first substrate 32. In particular, the pillars 33 are formed in lines in both the x and y directions along the top surface of the first substrate 32. Each pillar 33 is spaced apart from an adjacent pillar 33 by a distance of approximately 0.1 μm to 100 μm in both the x and y directions. The first electrode 36 and the second electrode 38 are each formed along an entire length of the first substrate 32 in the y direction. The first electrode 36 and the second electrode 38 each have a width of approximately 0.1 μm to 10 mm in the x direction and a length of approximately 0.1 μm to 10 mm in the y direction. However, it should be understood that the first electrode 36 and the second electrode 38 can each be formed as a plurality of electrode segments along the y direction.

The pillars 33 in FIG. 3 are shown from the top surface of the first substrate 32. As shown in FIG. 3, the pillars 33 are formed as a pattern of cubic pillars projecting from the top surface of the first substrate 32. However, it should be understood that the pillars 33 can have any suitable shape for holding the lubricant in the bottom liquid layer 24.

Figure 4:
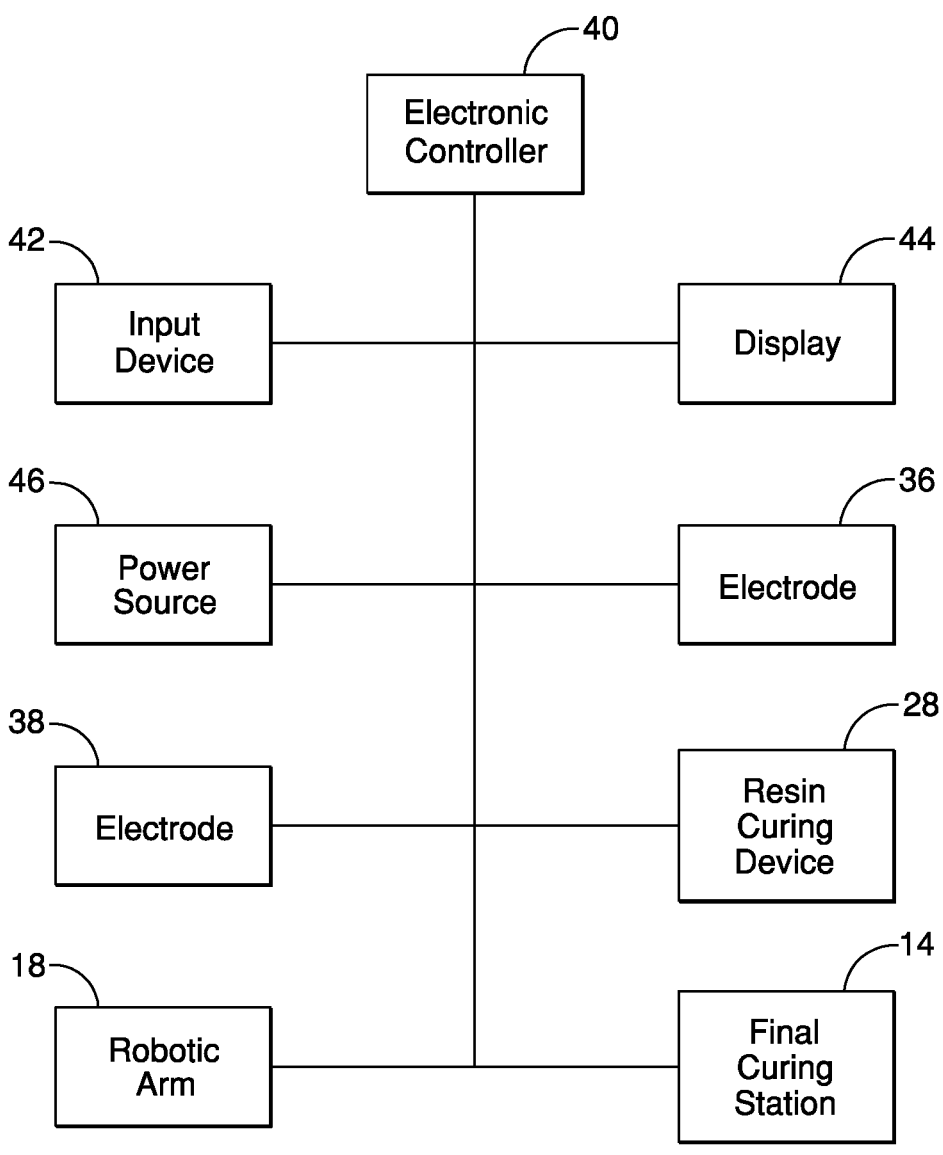
FIG. 4 is a block diagram showing an electronic controller in communication with elements of the printer assembly according to the first embodiment.

As shown in FIG. 4, the 3D printer apparatus 1 further includes an electronic controller 40, an input device 42, a display 44, and a power source 46. As shown in FIG. 4, the electronic controller 40 is electrically connected to, or alternatively can be in wireless electronic communication with, the input device 42, the display 44, the power source 46, the first electrode 36, the second electrode 38, the resin curing device 28, the robotic arm 16 and the final curing station 14.

The electronic controller 40 preferably includes a microcomputer with printer and robotic arm control programs that control the 3D printer apparatus 1, including the printer assembly 2 and the robotic arm 16. The electronic controller 40 can also include other conventional components such as an input interface circuit, an output interface circuit, and storage devices such as a ROM (Read Only Memory) device and a RAM (Random Access Memory) device. The microcomputer of the electronic controller 40 is programmed to control the printer assembly 2 and the robotic arm 16. The memory circuit stores processing results and control programs such as ones for printer and robotic arm operation that are run by the processor circuit. The electronic controller 40 is operatively and/or electronically coupled to the input device(s) 42, the display 44, the power source 46, the first electrode 36, the second electrode 38, the resin curing device 28, the final curing station 14 and the robotic arm 16 (and hence the object carrier 18) in a conventional manner. The internal RAM of the electronic controller 40 stores statuses of operational flags and various control data. The internal ROM of the electronic controller 40 stores the codes and instructions for various operations. It should be understood by those skilled in the art that the precise structure and algorithms for the electronic controller 40 can be any combination of hardware and software that will carry out the functions of the present disclosure.

The input device 42 can be any combination of, or all of: a mouse, a keyboard, a USB port, a wireless communication device (i.e., WiFi), and an Ethernet connection. The display 42 can be a touch screen display or a non-touch screen display.

The power source 46 is any suitable wireless or wired power source. For example, the power source 46 can be a battery, a fuel cell, a generator, or any combination thereof. It should be understood that the power source 46 can be connected to the electronic controller 40, the first electrode 36 and the second electrode 38 in a wired or wireless manner such that the electronic controller 40 can apply a potential to the first electrode 36 and the second electrode 38 via the power source 46.

During operation, the electronic controller 40 is configured to provide a positive electrical potential to the first electrode 36 and a negative electrode potential to the second electrode 38. By providing the positive and negative electrical potentials to the first electrode 36 and the second electrode 38, respectively, the electronic controller 40 is configured to move the lubricant in the bottom liquid layer 24 between the first electrode 36 and the second electrode 38. In particular, the electronic controller 40 causes a voltage difference between the first electrode 26 and the second electrode 28, which in turn causes the fixed anions or cations in the lubricant of the bottom liquid layer 24 to be electro-osmotically driven by the applied potential across the surface of the first substrate 32 and between the pillars 33. By causing such an electro-osmotic flow of the lubricant across and between the pillars 33 of the first substrate 32, undesirable bubbles that reduce the transparency of the textured window 26 can be prevented, and replenishing the oil maintains the adhesion prevention between the most recently cured layer of the object and the transparent substrate.

The electronic controller 40 is configured to operate the robotic arm 16 to precisely position the object carrier 18. In particular, the electronic controller 40 is configured to move the object carrier 18 vertically up and down along axis A5 within the tank 4 and is further configured to move the object carrier 18 and the object 20 printed thereon from the tank 4 of the printer assembly 2 to the rinse station 12 and the final curing station 14 (if necessary).

The robotic arm 18 is configured for movement about a vertical axis A1, horizontal axes A2, A3 and A4, and vertical axis A5. It should be understood by one skilled in the art that the robotic arm 16 is configured for multiple degrees of freedom of movement for precise movement and positioning of the object carrier 18 and the object 20 produced by the 3D printer apparatus 1. Usually the robotic arm simply moves the object carrier linearly up and down only. In this situation, the different shapes of the part are created by projecting light on different areas of the glass to create the part.

Figure 5A:
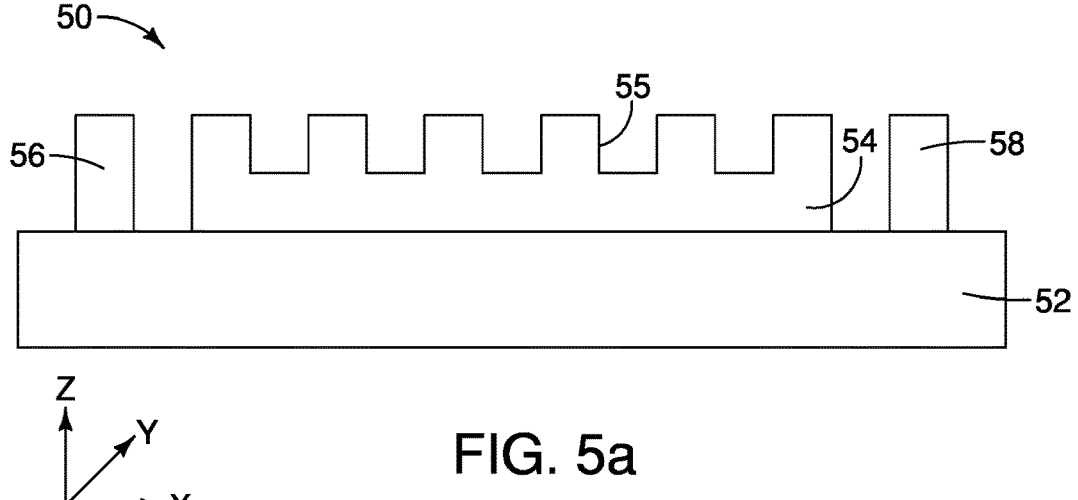
FIG. 5a is a cross sectional view of a textured window according to a second embodiment.
Figure 5B:
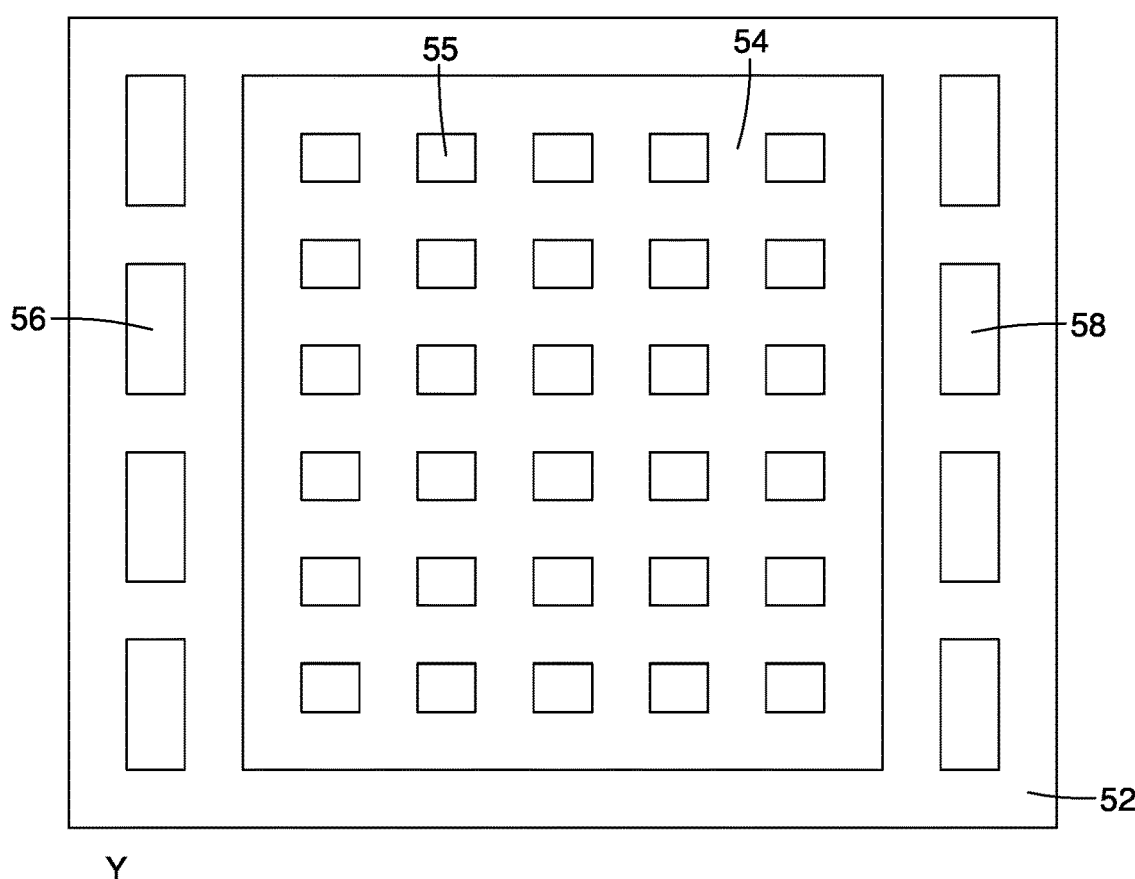
FIG. 5b is a top view of the textured window according to the second embodiment.

FIGS. 5a and 5b show a textured window 50 for a 3D printer assembly in accordance with a second embodiment. The textured window 50 includes a first substrate 52 and a second substrate 54 formed on a surface of the first substrate 52. The first substrate 52 is formed of any suitable optically transparent material. For example, the first substrate 52 can be made of any suitable transparent material, such as plexi-glass, traditional glass, any suitable transparent plastic or polymer material, or a mixture thereof. Preferably, the first substrate 52 is made of a glass material. The first substrate 52 has a thickness of approximately 9 μm to 3 cm.

The first substrate 52 can be formed on the top surface of the second substrate 54 in any suitable manner. For example, the first substrate 52 can be adhered to the second substrate 54 by an adhesive material. Alternatively, the first substrate 52 can be deposited on the second substrate 54 by any suitable deposition method, such as CVD, etching or additive and subtractive methods.

The second substrate 54 is formed of any suitable optically transparent and soft polymer material. For example, the second substrate 54 can be made of an optically transparent silicone polymer such as PDMS, an optically transparent fluorinated polymer, or a mixture thereof. Preferably, the second substrate 54 is made of PDMS. The second substrate 54 can also be porous. The second substrate 54 preferably has a porosity of approximately 30% to 70%. The second substrate 54 has a thickness of approximately 5 nm to 200 μm.

As shown in FIG. 5a, the second substrate 54 includes a plurality of pillars 55 formed on the top surface of the second substrate 54. The pillars 55 form a textured surface on the top of the second substrate 54. The pillars 55 are configured to hold liquid between the pillars 55 and can have any suitable shape. For example, the pillars 55 have a pillar-like shape and are formed as projections from the top surface of the second substrate 54. Preferably, the pillars 55 have a cubic shape with a same length, width and height from the surface of the second substrate 54. The pillars 55 have a height, length and width each ranging from approximately 0.1 μm to 100 μm.

As shown in FIGS. 5a and 5b, the textured window 50 also includes a plurality of first electrodes 56 and a plurality of second electrodes 58 each provided on opposite sides of and in a same plane as the second substrate 54. The first electrodes 56 and the second electrodes 58 are each provided on the top surface of the first substrate 52. Each of the first electrodes 56 is optically transparent and has an ultraviolet light transmittance of at least 60%, preferably at least 90%. The first electrodes 56 are all positive electrodes. The first electrodes 56 can each be formed of any suitable conductive and transparent positive electrode material, such as indium tin oxide, AZO, AgNW, AgNW-ZnO, gallium oxide nanoparticles with a quartz substructure, a layered structure of AZO/Ag/AZO, or a layered structure of $MoO_3$/graphene/$MoO_3$. It should be understood that the first electrodes 56 can each be formed of the same material or different positive electrode materials. The first electrodes 56 each have a thickness of approximately 0.1 μm to 10 mm.

Like the first electrodes 56, each of the second electrodes 58 are also optically transparent and have an ultraviolet light transmittance of at least 60%, preferably at least 90%. The second electrodes 58 are all negative electrodes. The second electrodes 58 can each be formed of any suitable conductive and transparent negative electrode material, such as indium tin oxide, AZO, AgNW, AgNW-ZnO, gallium oxide nanoparticles with a quartz substructure, a layered structure of AZO/Ag/AZO, or a layered structure of $MoO_3$/graphene/$MoO_3$. For example, the transparent negative electrode material can be the same as the transparent positive electrode material. It should be understood that the second electrodes 58 can each be formed of the same material or different negative electrode materials. The second electrodes 38 each have a thickness of approximately 0.1 μm to 10 mm.

In this embodiment, each of the first electrodes 56 is a positive electrode formed of a positive electrode material and each of the negative electrodes 58 is a negative electrode formed of a negative electrode material. However, it should be understood that alternatively, each of the first electrodes 56 can be a negative electrode formed of a negative electrode material and each of the second electrodes 58 can be a positive electrode formed of a positive electrode material.

FIG. 5b shows a top view of the textured window 50 of FIG. 5a. As shown in FIG. 5b, the plurality of pillars 55 are formed in a grid-like pattern on the second substrate 54. In particular, the pillars 55 are formed in lines in both the x and y directions along the top surface of the second substrate 54. Each pillar 55 is spaced apart from an adjacent pillar 55 by a distance of approximately 0.1 μm to 100 μm in both the x and y directions. The first electrodes 56 and the second electrodes 58 are each formed in a line as segments along an entire length of the second substrate 54 in the y direction. Each of the first electrodes 56 and each of the second electrodes 58 have a width of approximately 0.1 μm to 10 mm in the x direction and a length of approximately 0.1 μm to 10 mm in the y direction. However, it should be understood that each of the first electrodes 56 can have a different length from the other first electrodes 56, and each of the second electrodes 58 can have a different length from the other second electrodes 58. Furthermore, each of the first electrodes 56 can have a different length than any one of the second electrodes 58, and vice versa. It should also be understood that the first electrodes 56 can be formed alternatively as a single electrode, and the second electrodes 58 can be formed as a single electrode rather than a plurality of electrodes 58.

Figure 6:
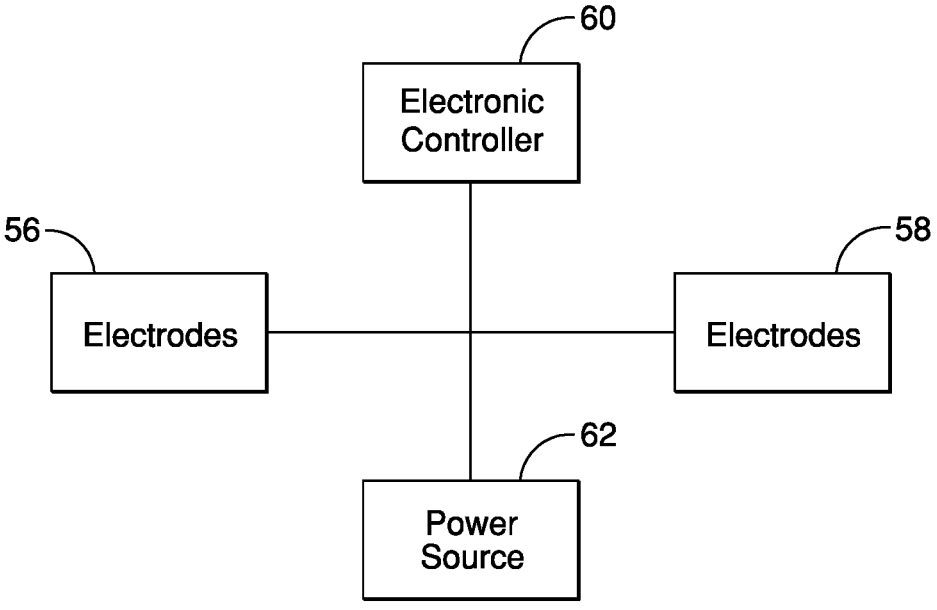
FIG. 6 is a block diagram showing an electronic controller in communication with elements of the textured window according to the second embodiment.

As shown in FIG. 6, the first electrodes 56 and the second electrodes 58 are each controlled by an electronic controller 60 of the 3D printer assembly. The electronic controller 60 is electrically connected to, or alternatively can be in wireless electronic communication with, each of the first electrodes 56, each of the second electrodes 58 and a power source 62.

The electronic controller 60 preferably includes a microcomputer with control programs that control the 3D printer assembly that includes the textured window 50, the electronic controller 60 and the power source 62. The electronic controller 60 can also include other conventional components such as an input interface circuit, an output interface circuit, and storage devices such as a ROM device and a RAM device. The microcomputer of the electronic controller 60 is programmed to control the 3D printer assembly. The memory circuit stores processing results and control programs. The electronic controller 60 is operatively and/or electronically coupled to the first electrodes 56, the second electrodes 58 and the power source 62 in a conventional manner. The internal RAM of the electronic controller 60 stores statuses of operational flags and various control data. The internal ROM of the electronic controller 60 stores the codes and instructions for various operations.

The power source 62 is any suitable wireless or wired power source. For example, the power source 62 can be a battery, a fuel cell, a generator, or any combination thereof. It should be understood that the power source 62 can be connected to the electronic controller 60, the first electrodes 56 and the second electrodes 58 in a wired or wireless manner such that the electronic controller 60 can apply a potential to each of the first electrodes 56 and each of the second electrodes 58 via the power source 60.

During operation, the electronic controller 60 is configured to provide a positive electrical potential to some or all of the first electrodes 56 and a negative electrode potential to some of all of the second electrodes 58. By providing the positive and negative electrical potentials to at least some of the first electrodes 56 and at least some of the second electrodes 58, respectively, the electronic controller 60 is configured to move a lubricant in the 3D printer assembly containing the textured window 50 between such first electrodes 56 and such second electrodes 58. In particular, the electronic controller 60 causes a voltage difference between at least some of the first electrodes 56 and at least some of the second electrodes 58, which in turn causes the fixed anions or cations in the lubricant of the 3D printer assembly to be electro-osmotically driven by the applied potential across the surface of the second substrate 54 and between the pillars 55. By causing such an electro-osmotic flow of the lubricant across and between the pillars 55 of the second substrate 54, undesirable bubbles that reduce the transparency of the textured window 50 can be prevented.

Figure 7A:
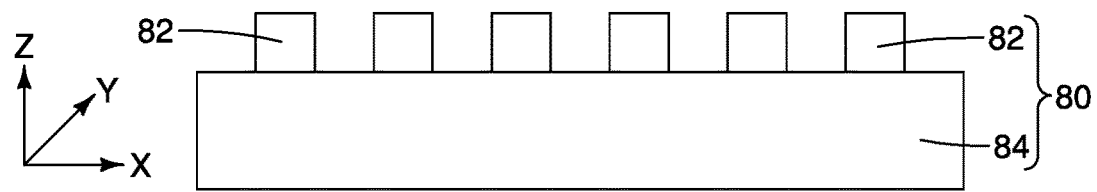
FIG. 7a is a cross sectional view of a textured window including electrodes according to a third embodiment.
Figure 7B:
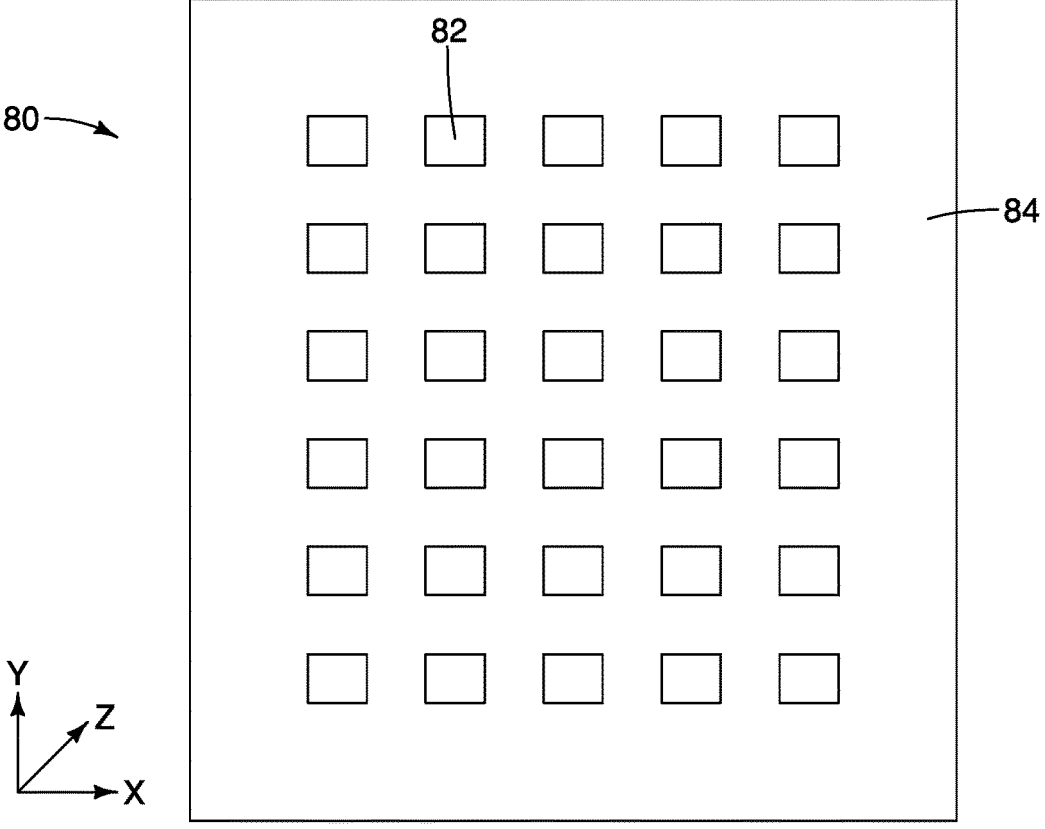
FIG. 7b is a top view of the textured window according to the third embodiment.

FIGS. 7a and 7b show a textured window 80 for a 3D printer assembly in accordance with a third embodiment. The textured window 80 includes a plurality of electrodes 82 formed on a surface of a first substrate 84. The first substrate 84 is formed of any suitable optically transparent material. For example, the first substrate 84 can be made of any suitable transparent material, such as plexiglass, traditional glass, any suitable transparent plastic or polymer material, or a mixture thereof. Preferably, the first substrate 84 is made of a glass material. The first substrate 84 has a thickness of approximately 9 μm to 3 cm.

The electrodes 82 can be formed on the top surface of the first substrate 84 in any suitable manner. For example, the electrodes 82 can be adhered to the first substrate 84 by an adhesive material. Alternatively, the electrodes 82 can be deposited on the first substrate 84 by any suitable deposition method, such as CVD, etching or additive and subtractive methods.

The electrodes 82 form a textured surface on the top of the first substrate 84. The electrodes 82 are configured to hold liquid between the electrodes 82 and can have any suitable shape. For example, the electrodes 82 have a pillar-like shape and are formed as projections from the top surface of the first substrate 84. Preferably, the electrodes 82 have a cubic shape with a same length, width and height from the surface of the first substrate 84. The electrodes 82 have a height, length and width each ranging from approximately 0.1 μm to 100 μm. The electrodes 82 collectively form a substrate on the surface of the first substrate 84.

FIG. 7b shows a top view of the textured window 80 of FIG. 7a. As shown in FIG. 7b, the electrodes 82 are formed in a grid-like pattern on the first substrate 84. In particular, the electrodes 82 are formed in lines in both the x and y directions along the top surface of the first substrate 84. Each electrode 82 is spaced apart from an adjacent electrode 82 by a distance of approximately 0.1 μm to 100 μm in both the x and y directions. Each of the electrodes 82 has a same width of approximately 0.1 μm to 10 mm in the x direction and a same length of approximately 0.1 μm to 10 mm in the y direction. However, it should be understood that each of the electrodes 82 can have different lengths and widths.

Figure 7C:
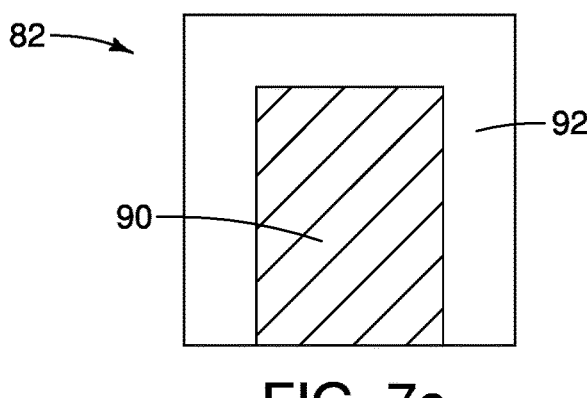
FIG. 7c is a cross sectional view of one of the electrodes according to the third embodiment.

As shown in FIG. 7c, each of the electrodes 82 is formed of a substrate material 90 and an electrode material 92. The substrate material 90 is any suitable optically transparent and soft polymer material. For example, the substrate material 90 can be an optically transparent silicone polymer such as PDMS, an optically transparent fluorinated polymer, or a mixture thereof. Preferably, the substrate material 90 is PDMS. The substrate material 90 can also be porous. The substrate material 90 preferably has a porosity of approximately 30% to 70%.

Each of the electrodes 82 is preferably formed of the same substrate material 90. However, it should be understood that the electrodes 82 may each be formed of different substrate materials 90, as long as the substrate material 90 is optically transparent and formed of a soft polymer material as described above. For each of the electrodes 82, the substrate material 90 is formed in a pillar-like shape having a width of approximately 0.01 μm to 100 μm in the x direction, a length of approximately 0.01 μm to 100 μm in the y direction, and a height of approximately 0.01 μm to 100 μm in the z direction. However, it should be understood that the substrate material 90 can be formed in any suitable shape for each electrode 82 and that the shape of the substrate material 90 for some of the electrodes 82 may be different than the shape of the substrate material 90 for other electrodes 82.

The electrode material 92 is optically transparent and has an ultraviolet light transmittance of at least 60%, preferably at least 90%. The electrode material 92 is conductive and can be any suitable transparent positive or negative electrode material, such as indium tin oxide, AZO, AgNW, AgNW—ZnO, gallium oxide nanoparticles with a quartz substructure, a layered structure of AZO/Ag/AZO, or a layered structure of $MoO_3$/graphene/$MoO_3$. It should be understood that the electrodes 82 include at least one positive electrode and at least one negative electrode. Therefore, the electrode material 92 for at least one of the electrodes 82 must be a positive electrode material, and the electrode material 92 for at least another one of the electrodes 82 must be a negative electrode material. The electrode material for each of the electrodes 82 is formed over the substrate material 90) with a thickness of approximately 0.01 μm to 100 μm.

FIG. 7b shows 30 electrodes 82. The electrodes 82 can include various positive and negative electrodes such that the electrodes 82 cause different electro-osmotic flows of lubricant between the electrodes 82 and across the first substrate 84 depending on the desired effect. For example, the electrodes 82 can be formed such that each of the electrodes 82 is formed of an alternating positive or negative electrode material in the x direction, the y direction or both directions. Alternatively, the electrodes 82 can be formed such that a single column of electrodes 82 along the y direction or a single row of electrodes in the x direction is all positive electrodes, and an adjacent column of electrodes 82 along the y direction or an adjacent row of electrodes 82 in the x direction is all negative electrodes.

One skilled in the art would understand that an electro-osmotic flow of lubricant will occur between two oppositely charged electrodes. As such, the type of electrode material 92 used in each electrode 82 will vary depending on which areas of the first substrate 84 it is desired to cause an electro-osmotic flow of lubricant. For example, the 3D printer assembly can include at least one sensor designed to detect the level of lubricant between each of the electrodes 82, and the electrodes 82 can be designed such that an electro-osmotic flow of lubricant is caused only in certain areas of the first substrate 84. The sensor can detect the amount of oil on the transparent substrate and the need for replenishment. The sensor can detect the amount of oil by sensing the resistance between electrodes, or other methods of sensing can be used. Alternatively, the electrodes 82 can be configured to cause a faster electro-osmotic flow of lubricant in certain areas of the first substrate 84 than in other areas.

Figure 8:
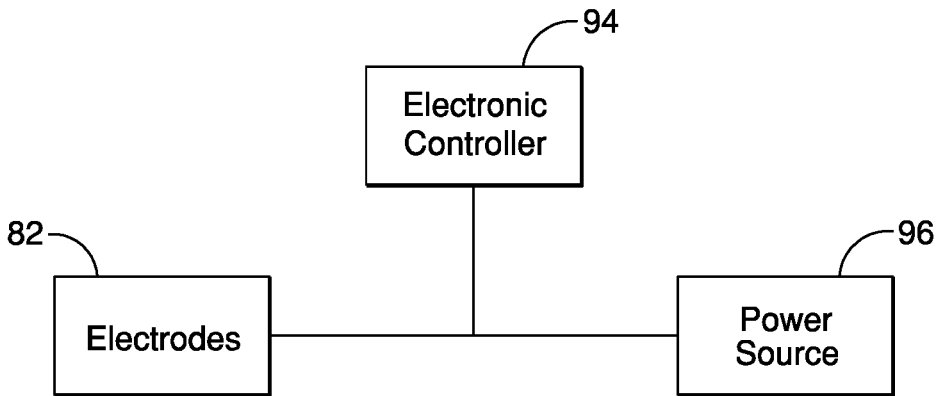
FIG. 8 is a block diagram showing an electronic controller in communication with the electrodes according to the third embodiment.

As shown in FIG. 8, the electrodes 82 are each controlled by an electronic controller 94. The electronic controller 94 is electrically connected to, or alternatively can be in wireless electronic communication with, each of the electrodes 82 and a power source 96.

The electronic controller 94 preferably includes a microcomputer with control programs that control a 3D printer apparatus that includes the textured window 80, the electronic controller 94 and the power source 96. The electronic controller 94 can also include other conventional components such as an input interface circuit, an output interface circuit, and storage devices such as a ROM device and a RAM device. The microcomputer of the electronic controller 94 is programmed to control the 3D printer apparatus. The memory circuit stores processing results and control programs. The electronic controller 94 is operatively and/or electronically coupled to the electrodes 82 and the power source 96 in a conventional manner. The internal RAM of the electronic controller 94 stores statuses of operational flags and various control data. The internal ROM of the electronic controller 94 stores the codes and instructions for various operations.

The power source 96 is any suitable wireless or wired power source. For example, the power source 96 can be a battery, a fuel cell, a generator, or any combination thereof. It should be understood that the power source 96 can be connected to the electronic controller 94 and the electrodes 82 in a wired or wireless manner such that the electronic controller 94 can apply a potential to each of the electrodes 82 via the power source 96.

During operation, the electronic controller 94 is configured to provide a positive electrical potential to some of the electrodes 82 and a negative electrode potential to other ones of the electrodes 82. By providing the positive electrical potentials to some of the electrodes 82 and the negative electrical potentials to the other electrodes 82, the electronic controller 94 is configured to move a lubricant in the 3D printer assembly containing the textured window 80 between the positive and negative ones of the electrodes 82. In particular, the electronic controller 94 causes a voltage difference between the electrodes 82 having the positive electrical potentials and the electrodes 82 having the negative electrode potentials, which in turn causes the fixed anions or cations in the lubricant of the 3D printer assembly to be electro-osmotically driven by the applied potential across the surface of the first substrate 84 and between the electrodes 82. By causing such an electro-osmotic flow of the lubricant across and between the electrodes 82 of the first substrate 84, undesirable bubbles that reduce the transparency of the textured window 80 can be prevented.

Figure 9:
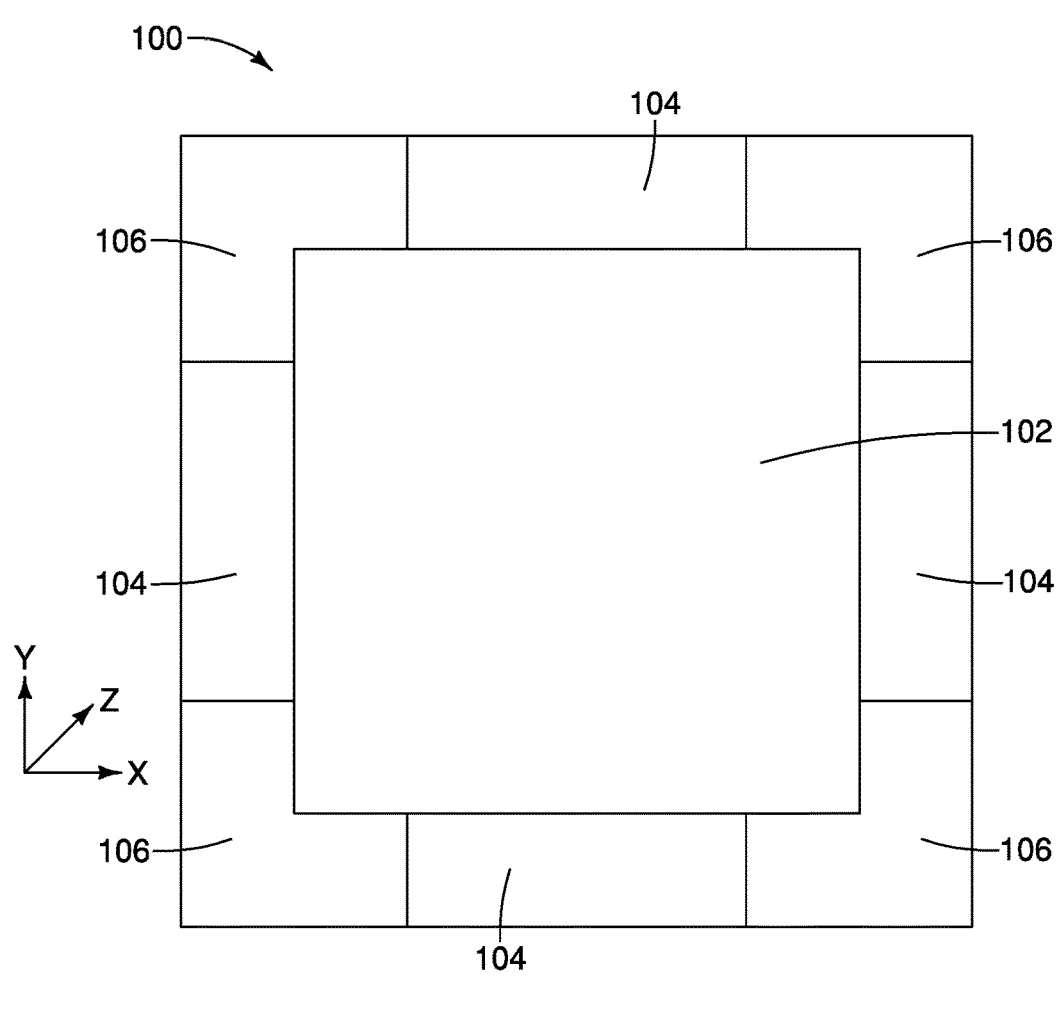
FIG. 9 is a top view of an electrode for a printer assembly according to a fourth embodiment.

FIG. 9 shows an electrode 100 for a 3D printer assembly according to a fourth embodiment. As shown in FIG. 9, the electrode 100 includes a first substrate material 102. The first substrate material 102 is any suitable optically transparent and soft polymer material. For example, the first substrate material 102 can be an optically transparent silicone polymer such as PDMS, an optically transparent fluorinated polymer, or a mixture thereof. Preferably, the first substrate material 102 is PDMS. The first substrate material 102 can also be porous. The first substrate material 102 preferably has a porosity of approximately 30% to 70%.

The first substrate material 102 is formed in a pillar-like shape having a width of approximately 0.01 μm to 100 μm in the x direction, a length of approximately 0.01 μm to 100 μm in the y direction, and a height of approximately 0.01 μm to 100 μm in the z direction. However, it should be understood that the first substrate material 102 can be formed in any suitable shape.

The electrode 100 also includes a conductive material 104 formed on each of the four sides of the substrate material 102. The conductive material 104 is optically transparent and has an ultraviolet light transmittance of at least 60%, preferably at least 90%. The conductive material 104 is conductive and can be any suitable transparent positive or negative electrode material, such as indium tin oxide, AZO, AgNW, AgNW-ZnO, gallium oxide nanoparticles with a quartz substructure, a layered structure of AZO/Ag/AZO, or a layered structure of $MoO_3$/graphene/$MoO_3$. The conductive material 104 is formed over the first substrate material 102 with a thickness of approximately 0.01 μm to 100 μm.

As shown in FIG. 9, the electrode 100 further includes a second substrate material 106 formed in the corners of the electrode 100. The second substrate material 106 is any suitable optically transparent and soft polymer material. For example, the second substrate material 106 can be an optically transparent silicone polymer such as PDMS, an optically transparent fluorinated polymer, or a mixture thereof. Preferably, the second substrate material 106 is PDMS. The second substrate material 106 can also be porous. The second substrate material 106 preferably has a porosity of approximately 30% to 70%. The second substrate material 106 is formed over the first substrate material 102 with a thickness of approximately 0.01 μm to 100 μm.

Figure 10:
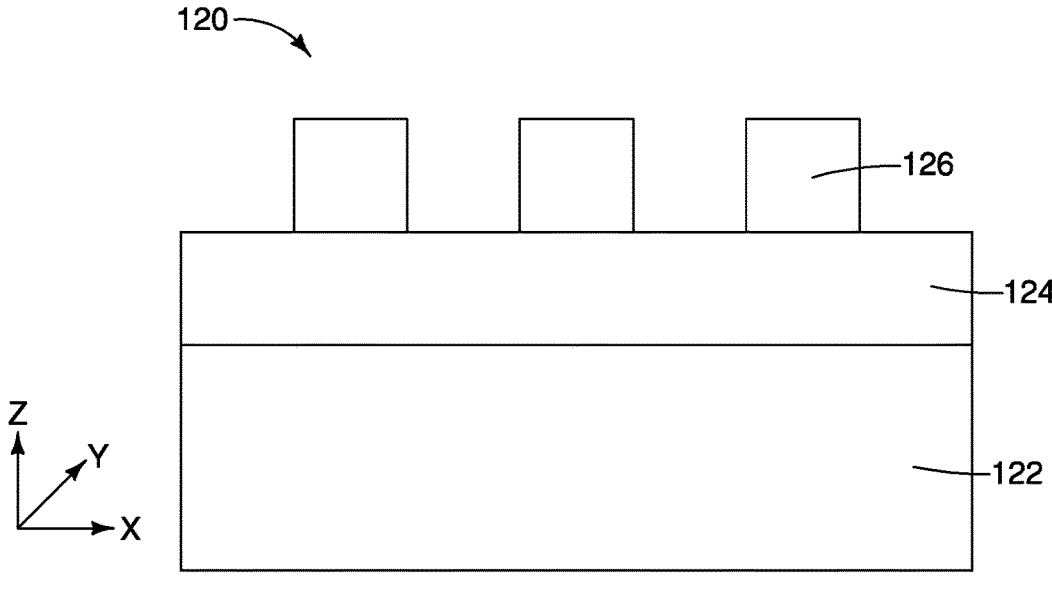
FIG. 10 is a cross sectional view of a textured window according to a fifth embodiment.

FIG. 10 shows a textured window for a 3D printer assembly according to a fifth embodiment. The textured window 120 includes a first substrate 122, a liquid crystal layer 124, and a plurality of electrodes 126 formed on a surface of the first substrate 52. The first substrate 122 is formed of any suitable optically transparent material. For example, the first substrate 122 can be made of any suitable transparent material, such as plexiglass, traditional glass, any suitable transparent plastic or polymer material, or a mixture thereof. Preferably, the first substrate 122 is made of a glass material. The first substrate 122 has a thickness of approximately 9 μm to 3 cm.

The liquid crystal layer 124 is formed of any suitable liquid crystal material. For example, the liquid crystal layer 124 can be formed of: nematic or smectic liquid crystal materials such as cyanobiphenyls, fluorinated biphenyls, carbonates, phenyl esters, Schiff bases, and azoxybenzenes, cholesteric liquid crystal materials such as cholesteryl compounds, discotic liquid crystal materials, and mixtures thereof. The liquid crystal layer 124 can be formed on the top surface of the first substrate 122 in any suitable manner. For example, the liquid crystal layer 124 can be adhered to the first substrate 122 by an adhesive material. Alternatively, the liquid crystal layer 124 can be deposited on the first substrate 122 by any suitable deposition method, such as CVD, etching or additive and subtractive methods. The liquid crystal layer 124 has a thickness of approximately 1 μm to 10 μm.

The electrodes 126 can be formed on the top surface of the liquid crystal layer 124 in any suitable manner. For example, the electrodes 126 can be adhered to the liquid crystal layer 124 by an adhesive material. Alternatively, the electrodes 126 can be deposited on the liquid crystal layer 124 by any suitable deposition method, such as CVD, etching or additive and subtractive methods.

The electrodes 126 form a textured surface on the top of the liquid crystal layer 124. The electrodes 126 are configured to hold liquid between the electrodes 126 and can have any suitable shape. For example, the electrodes 126 have a pillar-like shape and are formed as projections from the top surface of the liquid crystal layer 124. Preferably, the electrodes 126 have a cubic shape with a same length, width and height from the surface of the liquid crystal layer 124. The electrodes 126 have a height, length and width each ranging from approximately 0.1 μm to 100 μm. The electrodes 126 collectively form a substrate on the surface of the liquid crystal layer 124.

The electrodes 126 can be formed in any suitable pattern on the liquid crystal layer 124. For example, the electrodes 126 can be formed in a grid-like pattern on the liquid crystal layer 124. In particular, each electrode 126 can be spaced apart from an adjacent electrode 126 by a distance of approximately 0.1 μm to 100 μm in both the x and y directions. Each of the electrodes 126 has a same width of approximately 0.1 μm to 100 μm in the x direction and a same length of approximately 0.1 μm to 100 μm in the y direction. However, it should be understood that each of the electrodes 126 can have different lengths and widths.

As with the electrodes 82 of the third embodiment, each of the electrodes 126 is formed of a substrate material and an electrode material. The substrate material is any suitable optically transparent and soft polymer material. For example, the substrate material can be an optically transparent silicone polymer such as PDMS, an optically transparent fluorinated polymer, or a mixture thereof. Preferably, the substrate material is PDMS. The substrate material can also be porous and preferably has a porosity of approximately 30% to 70%.

Each of the electrodes 126 is preferably formed of the same substrate material. However, it should be understood that the electrodes 126 may each be formed of different substrate materials, as long as the substrate materials are all optically transparent and formed of a soft polymer material as described above. The electrodes 126 each have a pillar-like shape. However, it should be understood that the electrodes 126 can be formed in any suitable shape.

The electrode material is optically transparent and has an ultraviolet light transmittance of at least 60%, preferably at least 90%. The electrode material is conductive and can be any suitable transparent positive or negative electrode material, such as indium tin oxide, AZO, AgNW, AgNW-ZnO, gallium oxide nanoparticles with a quartz substructure, a layered structure of AZO/Ag/AZO, or a layered structure of $MoO_3$/graphene/$MoO_3$. It should be understood that the electrodes 126 include at least one positive electrode and at least one negative electrode. Therefore, the electrode material for at least one of the electrodes 126 must be a positive electrode material, and the electrode material for at least another one of the electrodes 126 must be a negative electrode material.

The electrodes 126 can include various positive and negative electrodes such that the electrodes 126 cause different electro-osmotic flows of lubricant between the electrodes 126 and across the liquid crystal layer 124 depending on the desired effect. One skilled in the art would understand that an electro-osmotic flow of lubricant will occur between two oppositely charged electrodes. As such, the type of electrode material used in each electrode 126 will vary depending on which areas of the liquid crystal layer 124 it is desired to cause an electro-osmotic flow of lubricant. For example, the 3D printer assembly can include at least one sensor designed to detect the level of lubricant between each of the electrodes 126, and the electrodes 126 can be designed such that an electro-osmotic flow of lubricant is caused only in certain areas of the liquid crystal layer 124. Alternatively, the electrodes 124 can be configured to cause a faster electro-osmotic flow of lubricant in certain areas of the liquid crystal layer 124 than in other areas.

Furthermore, a skilled artisan would understand that the liquid crystal layer 124 can be used to selectively turn "on" and "off" various ones of the electrodes 126 to create the desired electro-osmotic flow in the textured window 120.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A three-dimensional printing system comprising:
a tank containing a liquid photopolymer resin and a lubricant;
a textured substrate connected to the tank, the textured substrate being configured to allow light to pass through into the liquid photopolymer resin; and
at least one electrode,
the at least one electrode being optically transparent and being configured to control a flow of the lubricant on the textured substrate.

2. The three-dimensional printing system according to claim 1, wherein:
the textured substrate comprises a first substrate that is optically transparent and a second substrate formed on a surface of the first substrate, and
the second substrate includes a textured surface facing the liquid photopolymer resin.

3. The three-dimensional printing system according to claim 2, wherein
the textured substrate includes at least one pillar.

4. The three-dimensional printing system according to claim 3, wherein each of the at least one pillar is formed directly on the surface of the first substrate.

5. The three-dimensional printing system according to claim 3, wherein:

the at least one electrode includes a plurality of electrodes, and each of the at least one pillar is one of the plurality of electrodes.

6. The three-dimensional printing system according to claim 2, wherein the first substrate is formed of a glass material.

7. The three-dimensional printing system according to claim 2, wherein the second substrate is formed of polydimethylsiloxane.

8. The three-dimensional printing system according to claim 2, wherein:

the at least one electrode includes at least one positive electrode and at least one negative electrode, and the at least one positive electrode and the at least one negative electrode each overlay the surface of the first substrate on opposite sides of the second substrate.

9. The three-dimensional printing system according to claim 1, further comprising at least one of a pump and a reservoir configured to supply the lubricant to the tank.

10. The three-dimensional printing system according to claim 1, further comprising at least one sensor configured to detect an amount of the lubricant in a portion of the textured substrate.

11. The three-dimensional printing system according to claim 1, wherein the lubricant is an oil that includes an additive with a higher sensitivity to electroosmosis than the oil.

12. The three-dimensional printing system according to claim 1, wherein the at least one electrode includes electrodes disposed on opposite sides of the textured substrate.

13. The three-dimensional printing system according to claim 1, wherein the lubricant is in contact with the at least one electrode.

14. The three-dimensional printing system according to claim 1, wherein the at least one electrode is provided on the first substrate and is spaced apart from the second substrate.

15. A three-dimensional printing system comprising:

a tank containing a liquid photopolymer resin and a lubricant;

a textured substrate connected to the tank, the textured substrate being configured to allow light to pass through into the liquid photopolymer resin;

at least one electrode; and at least one of a pump and a reservoir configured to supply the lubricant to the tank, the at least one electrode being configured to control a flow of the lubricant on the textured substrate.

16. A three-dimensional printing system comprising:

a tank containing a liquid photopolymer resin and a lubricant;

a textured substrate connected to the tank, the textured substrate being configured to allow light to pass through into the liquid photopolymer resin;

at least one electrode; and at least one sensor configured to detect an amount of the lubricant in a portion of the textured substrate, the at least one electrode being configured to control a flow of the lubricant on the textured substrate.

\* \* \* \* \*